US009846915B2

(12) United States Patent
Howe et al.

(10) Patent No.: US 9,846,915 B2
(45) Date of Patent: Dec. 19, 2017

(54) IMAGE CAPTURE SYSTEM FOR PROPERTY DAMAGE ASSESSMENT

(71) Applicant: Conduent Business Services, LLC, Dallas, TX (US)

(72) Inventors: Richard L. Howe, Webster, NY (US); Valerie J. Raburn, South Haven, MI (US); Edgar A. Bernal, Webster, NY (US); Matthew Adam Shreve, Webster, NY (US); Peter Paul, Penfield, NY (US); Pramod Sankar Kompalli, Telangana (IN)

(73) Assignee: Conduent Business Services, LLC, Dallas, TX (US)

( * ) Notice: Subject to any disclaimer, the term of this patent is extended or adjusted under 35 U.S.C. 154(b) by 0 days.

(21) Appl. No.: 15/079,144

(22) Filed: Mar. 24, 2016

(65) Prior Publication Data

US 2017/0270612 A1    Sep. 21, 2017

Related U.S. Application Data

(60) Provisional application No. 62/309,587, filed on Mar. 17, 2016.

(51) Int. Cl.
*G06K 9/46* (2006.01)
*G06Q 40/08* (2012.01)
(Continued)

(52) U.S. Cl.
CPC ............ *G06Q 40/08* (2013.01); *G06K 9/46* (2013.01); *G06K 9/4604* (2013.01);
(Continued)

(58) Field of Classification Search
CPC ...... G06Q 40/08; G06Q 10/10; G06Q 20/042; G06Q 20/3276; G06Q 10/06;
(Continued)

(56) References Cited

U.S. PATENT DOCUMENTS 6,098,070 A * 8/2000 Maxwell ............... G06Q 10/10
6,219,930 B1    4/2001 Reid
(Continued)

OTHER PUBLICATIONS

Krizhevsky A. et al., "ImageNet Classification with Deep Convolutional Neural Networks", Advances in Neural Information Processing System 25, 2012, p. 1106-1114.
(Continued)

*Primary Examiner* — Aklilu Woldemariam
(74) *Attorney, Agent, or Firm* — Fox Rothschild LLP

(57) ABSTRACT

A system for capturing property damage images includes an imaging device and a knowledge base of property damage incident types. The knowledge base also includes, for each category, one or more image acquisition parameters that are associated with the category. A processor receives a property damage incident type for a property damage claim that is associated with a property that reportedly experienced an incident, retrieves from the knowledge base one or more image acquisition parameters that are associated with the received incident type, and uses the one or more applicable image acquisition parameters to automatically cause the imaging device to capture digital images of the property using the retrieved one or more image acquisition parameters.

18 Claims, 7 Drawing Sheets

(51) Int. Cl.
  *G06Q 30/02* (2012.01)
  *G06K 9/62* (2006.01)
  *G06T 7/00* (2017.01)

(52) U.S. Cl.
  CPC ....... *G06K 9/6202* (2013.01); *G06Q 30/0278* (2013.01); *G06T 7/0081* (2013.01)

(58) Field of Classification Search
  CPC ......... G06Q 10/0631; G06Q 10/06311; G06Q 10/063114; G06Q 10/103; G06Q 50/163; G06Q 50/22; G06F 17/00; G06F 17/3028; G06F 17/30; G06F 17/60; G06K 2009/4657; G06K 9/00791; G06K 9/52; G06K 9/6201; G06K 9/00449; G06K 9/32; G06K 9/38; G06K 9/42; G06K 9/00577; G06K 2009/00644; G06K 9/522; G06T 11/206; G06T 2207/10004; G06T 7/0002; H04N 7/18; H04N 1/00307; H04N 2101/00; H04N 2201/001; H04N 1/00244; H04N 2201/0084; B23K 2201/006; B23K 26/707; G07D 7/20; G07D 7/124; G07D 7/121; H01S 3/0014; H01S 3/005; G03G 21/046; G07C 5/085; G07C 5/0858; G07C 5/0891
  USPC ........ 382/100, 190, 199, 203; 705/2, 3, 4, 7, 705/38, 39, 40, 301, 313, 314
  See application file for complete search history.

(56) References Cited

U.S. PATENT DOCUMENTS

| | | | |
|---|---|---|---|
| 7,676,061 B2* | 3/2010 | Harrison | B23K 26/032 382/100 |
| 8,078,875 B2* | 12/2011 | Cowburn | G06K 9/00577 235/375 |
| 8,170,840 B2 | 5/2012 | Pershing | |
| 8,209,152 B2 | 6/2012 | Pershing | |
| 8,346,578 B1* | 1/2013 | Hopkins, III | G06Q 40/00 382/100 |
| 8,401,222 B2 | 3/2013 | Thornberry et al. | |
| 8,401,877 B2 | 3/2013 | Salvagio | |
| 8,515,125 B2 | 8/2013 | Thornberry et al. | |
| 8,670,961 B2 | 3/2014 | Pershing et al. | |
| 8,731,234 B1 | 5/2014 | Ciarcia et al. | |
| 8,756,085 B1 | 6/2014 | Plummer et al. | |
| 8,774,525 B2 | 7/2014 | Pershing | |
| 8,775,219 B2 | 7/2014 | Swanson et al. | |
| 8,818,572 B1 | 8/2014 | Tofte et al. | |
| 8,818,770 B2 | 8/2014 | Pershing | |
| 8,825,454 B2 | 9/2014 | Pershing | |
| 8,874,454 B2 | 10/2014 | Plummer et al. | |
| 8,929,586 B2 | 1/2015 | Brown | |
| 8,977,520 B2 | 3/2015 | Stephens et al. | |
| 8,995,757 B1 | 3/2015 | Ciarcia et al. | |
| 9,002,719 B2* | 4/2015 | Tofte | G06Q 40/08 345/420 |
| 2005/0251427 A1* | 11/2005 | Dorai | G06Q 40/08 705/4 |
| 2006/0095304 A1* | 5/2006 | Madison | G06Q 40/08 705/4 |
| 2008/0103841 A1* | 5/2008 | Lewis | G06Q 40/04 705/4 |
| 2009/0063234 A1* | 3/2009 | Refsland | G06Q 10/06 705/7.15 |
| 2009/0265193 A1 | 10/2009 | Collins et al. | |
| 2009/0276708 A1* | 11/2009 | Smith | G06Q 10/087 715/716 |
| 2010/0179787 A2 | 7/2010 | Pershing et al. | |
| 2010/0215212 A1 | 8/2010 | Flakes, Jr. | |
| 2010/0257477 A1* | 10/2010 | Nielsen | G07C 5/085 715/771 |
| 2013/0117078 A1* | 5/2013 | Weik, III | G06Q 10/00 705/13 |
| 2013/0297353 A1* | 11/2013 | Strange | G06Q 40/08 705/4 |
| 2014/0032433 A1* | 1/2014 | Eick | G06Q 50/163 705/314 |
| 2014/0039935 A1* | 2/2014 | Rivera | G06Q 40/08 705/4 |
| 2014/0149144 A1* | 5/2014 | Li | G06F 17/2785 705/4 |
| 2015/0332355 A1* | 11/2015 | Kost | G06Q 30/0283 705/35 |
| 2016/0086285 A1* | 3/2016 | Jordan Peters | G06Q 40/08 705/4 |

OTHER PUBLICATIONS

Huang H. et al., "Rule-based Roof Plane Detection and Segmentation from Laser Point Clouds", In: Stilla U, Gamba P., Juergens C., Maktav D. (Eds) JURSE 2011—Joint Urban Remote Sensing Event—Munich, Germany, Apr. 11-13, 2011.

El-merabet Y. et al., "Watershed regions and watershed lines based cooperation strategy for image segmentation. Application to roof detection", ISSPIT '11 Proceedings of the 2011 IEEE International Symposium on Signal Processing and information Technology, pp. 393-398.

Bretar F. et al., "Recognition of Building Roof Facets by Merging Aerial Images and 3D Lidar Data in a Hierarchical Segmentation Framework", 18th International Conference on Pattern Recognition (ICPR'06) (vol. 4), Hong Kong Aug. 20, 2006-Aug. 24, 2006.

\* cited by examiner

IMAGE CAPTURE SYSTEM FOR PROPERTY DAMAGE ASSESSMENT

CROSS-REFERENCE TO RELATED APPLICATIONS

This application claims priority to U.S. Patent Application 62/309,587, filed on Mar. 17, 2016, the entirety of which is included herein by reference.

BACKGROUND

This disclosure relates to methods and systems that capture images of property damage, process those images, and use the information gathered from the processed image for actions such as automated property damage claim verification.

Today, when an owner of a building or other structure experiences property damage resulting from an incident such as hail, wind, lightning, vandalism, or other activity, several steps must occur to remediate the damage. In some situations, the property owner may need to ask a construction contractor to prepare a detailed description and assessment of the damage in order for the contractor to determine what is needed to fix the property. In other situations, the property owner may first need to submit a claim to its property insurer.

Currently, to submit a property damage claim, the property owner first calls the insurance company. Then the insurance company dispatches a claim adjuster to the property. The adjuster manually surveys the property and the damage to it, takes pictures of the damaged area(s), measures the damaged area(s), and takes notes (usually by hand on paper or mobile device) describing the type and extent of the damage. When the damage to the property is on the roof, the adjuster is usually required to climb a ladder and get on or near the roof in order to be able to perform these tasks. The adjuster commonly is carrying a camera, chalk, tape measure and note pad or electronic device for capturing notes. A similar process can apply when a contractor is assessing property damage to determine what is needed to remediate the damage In the case of insurance, the adjuster may enter the pictures, measurements, and notes that he or she captured into a claims processing system. The adjuster makes a determination as to whether the damage was due to a cause covered by the insurance contract, and he or she determines (or passes on the appropriate info to the system to determine) the amount that the insurer will pay on the claim. In computing the payment amount, the system may take into consideration the cost of material, labor and factors unique to the property owner's policy (e.g., deductible, depreciation, policy limits, etc.).

This process has several problems. For example, it is manually time-consuming for the adjuster to perform on-site at the property. Following catastrophic weather events, as the claims volume greatly exceeds the standard adjusting capacity of the typical insurer, there could be delays in inspection, payment and the timely booking of a repair contractor. It is also potentially dangerous to have the adjuster inspect the property, especially if the inspection requires getting on a ladder and/or the roof (and note that this requires that the adjuster be insured to a higher level coverage, which is another cost in the process). Further, in the current property damage claim system, assessment results are not consistent from adjuster to adjuster. Most of the above drawbacks may contribute to lower customer (i.e., policyholder) satisfaction than likely would be the case if the process was more consistent and efficient. Therefore, the current process for processing a property damage insurance claim can be labor-intensive, costly, slow, and unsafe.

This document describes devices and methods that are intended to address issues discussed above and/or other issues.

SUMMARY

In an embodiment, a system for capturing property damage images includes a data storage facility containing a knowledge base of property damage incident types and, for each incident type, one or more image acquisition parameters that are associated with the incident type. The system also includes an imaging device, a processing device having one or more communications components configured to communicate with the data storage facility and the imaging device, and a computer-readable medium containing programming instructions that are configured to cause the computer processor to implement certain methods. The methods may include receiving a property damage incident type for a property damage claim of a property that has reportedly experienced an incident, and accessing the data storage facility and retrieving from the knowledge base one or more image acquisition parameters that are associated with the received property damage incident type. The system will use the one or more image acquisition parameters to automatically cause the imaging device to capture digital images of the property using the retrieved one or more image acquisition parameters.

Optionally, the system may also be configured to receive the digital images captured by the imaging device, and to automatically process the received digital images to identify at least one digital image that depicts property damage that corresponds to the incident type. The automatic processing may include: accessing the data storage facility and extracting from the knowledge base one or more image quality criteria that are associated with the received property damage category; processing the received digital images to automatically detect at least one digital image having one or more characteristics that satisfy the one or more image quality criteria; and determining that the detected at least one digital image depicts the property damage that corresponds to the incident type.

Optionally, the system may include a brightness sensor, and programming instructions that are configured to cause the system to receive a light level that is detected by the brightness sensor. If so, the retrieved image acquisition parameter(s) may include or more of the following: a command that determines whether to operate a flash that is associated with the imaging device; a setting that determines a size for an adjustable aperture of the optical path in the imaging device; a speed setting that determines a speed with which a shutter of the imaging device will open or close; or an ISO setting that determines a sensitivity of the imaging device.

Optionally, the imaging device may be a component of an aerial drone; and the image acquisition parameters may comprise a flight path for the aerial drone. If so, the system may be configured to automatically process a group of the digital images captured by the imaging device to identify at least one digital image that depicts property damage that corresponds to the incident type. Upon identification of at least one digital image that depicts property damage that corresponds to the incident type, the system may generate a command to cause the drone to move according to the flight path.

Optionally, the knowledge base may include image acquisition guidance data, and the system may also include a user interface that is in communication with the processing device. If so, the system may be configured to: retrieve from the knowledge base image acquisition guidance applicable to capturing one or more images associated with the incident type; and display the image acquisition guidance on the user interface. The system also may be configured to: receive, via the user interface, a camera setting; cause the imaging device to capture a plurality of additional digital images of the property using the camera setting; automatically process the plurality of additional digital images to identify at least one digital image that depicts property damage that corresponds to the incident; identify an updated image acquisition parameter corresponding to one or more camera settings used when the imaging device captured at least one digital image that depicts property damage; and save the updated image acquisition parameter to the knowledge base. The system also may be configured to: prompt a user to enter, via the user interface, voice or text commentary while the imaging device is capturing digital images of the property; and save the plurality of digital images to a digital file with annotations corresponding to the commentary. The system also may be configured to: prompt a user to enter, via the user interface, voice or text commentary while the imaging device is capturing digital images of the property; process the commentary and the captured digital images to identify an updated image acquisition parameter; and save the updated image acquisition parameter to the knowledge base.

In some embodiments, the knowledge base may include, for each property damage incident type, one or more associated image quality criteria. If so, the system may pre-screen the captured digital images to identify one or more images that qualify for use in a property damage claim assessment by: accessing the knowledge base and extracting one or more image quality criteria that are associated with the received property damage incident type; processing the captured digital images to identify one or more digital images having characteristics that satisfy the one or more image quality criteria; and selecting the identified digital image(s) as the one or more images that qualify for use in the property damage claim assessment. The system also may be configured to save the one or more images that qualify for use in the property damage claim assessment to the knowledge base, and discard any of the captured images that do not qualify for use in the property damage claim assessment. In addition or alternatively, the system may be configured to use the characteristics to identify an updated image acquisition parameter, and save the updated image acquisition parameter to the knowledge base.

DETAILED DESCRIPTION

Figure 1:
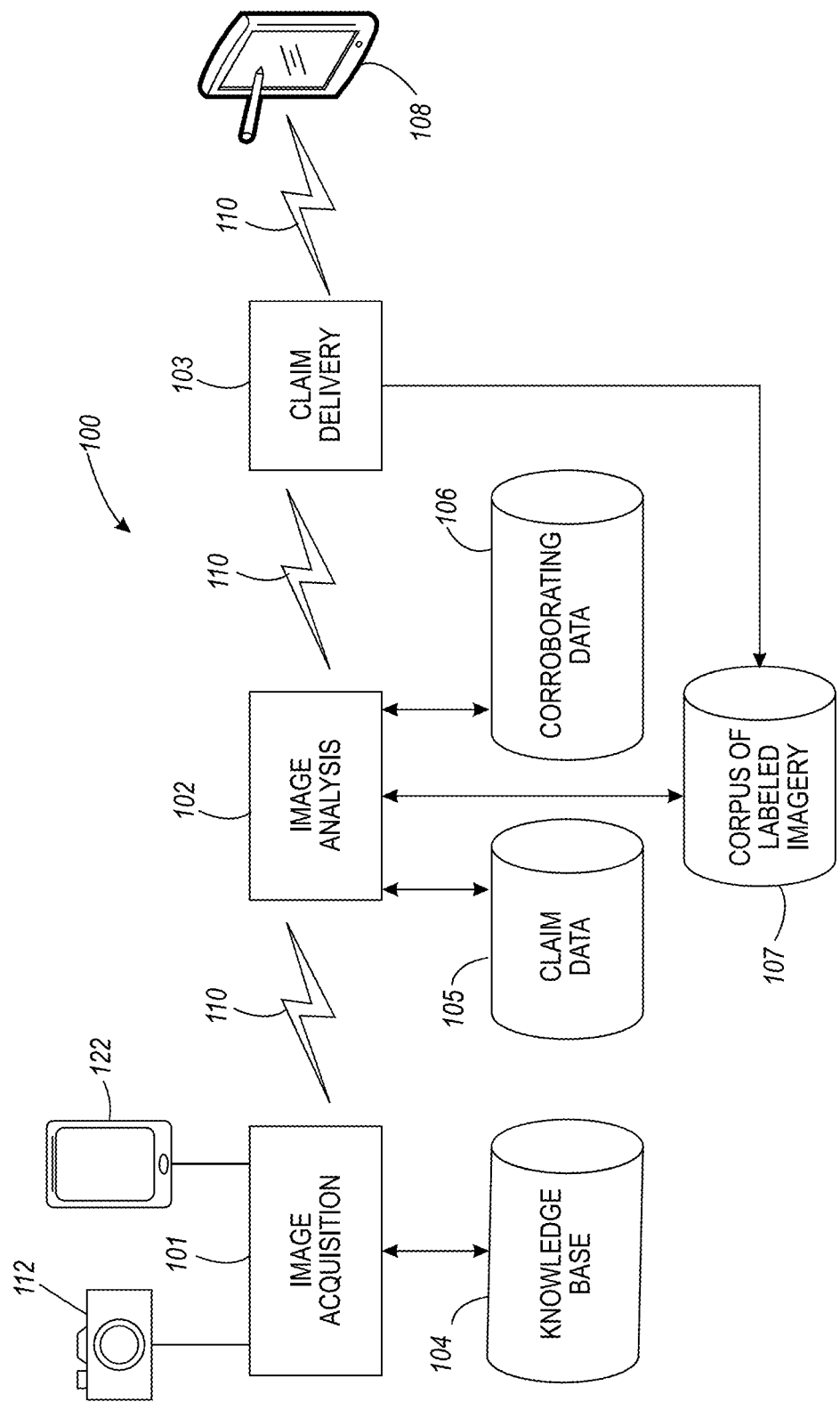
FIG. 1 illustrates an overall system according to one embodiment.

This disclosure is not limited to the particular systems, methodologies or protocols described in this document, as these may vary. The terminology used in this description is for the purpose of describing the particular versions or embodiments only, and is not intended to limit the scope.

As used in this document, any word in singular form, along with the singular forms "a," "an" and "the," include the plural reference unless the context clearly dictates otherwise. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used herein, the term "comprising" means "including, but not limited to."

In this document, the term "aerial drone" refers to an unmanned vehicle that uses aerodynamic forces to provide vehicle lift, and that can fly autonomously or be piloted remotely. An aerial drone may also be referred to by those of skill in the art as an unmanned aerial vehicle (UAV), unmanned aircraft system (UAS), a remotely-piloted aircraft (RPA), or simply a drone.

In this document the terms "computer-readable medium," "data storage facility," and "memory" each refer to a non-transitory device on which computer-readable data, programming instructions, or both are stored. Unless the context specifically states that a single device is required or that multiple devices are required, the terms "computer-readable medium," "data storage facility," and "memory" include both the singular and plural embodiments, as well as portions of such devices such as memory sectors.

In this document, the term "electronic device" refers to a device or system of devices that include a processor and a computer-readable medium. The memory may contain programming instructions in the form of a software application that, when executed by the processor, causes the device to perform one or more processing operations according to the programming instructions. An electronic device also may include additional components such as a touch-sensitive display device, microphone, keyboard or keypad or other components that serve as a user interface, as well as a camera or other imaging device. An electronic device also may include one or more communication hardware components such as a transmitter and/or receiver that will enable the device to send and/or receive signals to and/or from other devices, whether via a communications network or via near-field or short-range communication protocols. Examples of electronic devices include smartphones, digital cameras, tablet computing devices, aerial drones, personal computers, wearable electronic devices, and the like.

In this document, the term "digital image" refers to any still image and/or set of video images captured and stored as one or more digital data files. Examples include pictures and videos that are captured by a camera or by an electronic device that includes a camera, visible spectrum images, infrared (IR) spectrum images, ultraviolet (UV) spectrum images, three-dimensional images gathered by LIDAR or other systems, images gathered using an RGB-D imaging modality (such as a KINECT® sensor device), images gathered by other remote sensing technologies, and the like. The term "frame" in an image refers to a still or video frame.

In this document, the term "incident" means a physical action that caused damage or other loss to an item of physical property. Examples include a weather incident that damaged a building or vehicle (such as hail, wind or lightning damage), or a falling object or collision that damaged a building or vehicle. An "incident type" is a descriptor that is used to identify one or more incidents, such as a word, name or code.

In this document, the term "imaging device" refers generally to a hardware sensor that is configured to acquire digital images. An imaging device may capture still and/or video images, and optionally may be used for other imagery-related applications. For example, an imaging device can be held by a user such as a DSLR (digital single lens reflex) camera, cell phone camera, or video camera. The imaging device may be part of an image capturing system that includes other hardware components. For example, an imaging device can be mounted on an accessory such as a monopod, tripod, or "selfie stick." The imaging device can also be mounted on a transporting vehicle such as an aerial drone, a robotic vehicle, or on a piloted aircraft such as a plane or helicopter.

In this document, the terms "processor" and "processing device" refer to a hardware component of an electronic device that is configured to execute programming instructions. The term "processor" may refer to either a single processor or to multiple processors that together implement various steps of a process. Unless the context specifically states that a single processor is required or that multiple processors are required, the term "processor" includes both the singular and plural embodiments.

With reference to FIG. 1, a property damage assessment and verification system 100 is shown by way of example. An image acquisition system 101 captures digital images of the damaged part(s) of the property via an imaging device 112, and transfers the captured digital images to the image analysis system 102 via a communication link 110. The image analysis system 102 automatically analyzes the acquired images and communicates the property damage assessment results to a claim delivery system 103 via a communication link 110. The claim delivery system 103 communicates the claim results to an electronic device 108 of a relevant party via a communication link 110. The communication links may be separate or common components of a wired or wireless communication system, such as a wire or bus (in a wired system), or transmitter/receiver and/or communication port for use in a near-field, short-range, local-area, wide area, mobile data or other communications network (such as the Internet).

In one scenario, when a property owner believes that her property has suffered damage that is covered by her insurance policy, she may initiate the claim process by contacting her insurance company. The insurance company subsequently dispatches an operator, such as an insurance company adjuster, a third-party adjuster, or another party (for instance, a roofing contractor or a drone flying service company) to the property. In one embodiment, the image acquisition system 101 is or includes a portable electronic device that the operator carries, such as a cell phone camera used in handheld mode or mounted to a "selfie stick." In other embodiments, the image acquisition system 101 may include an imaging device 112 mounted to an aerial drone or robotic vehicle, along with a separate controlling electronic device 122 having a wireless transceiver to send control signals to and receive digital images from the aerial or robotic electronic device that contains the imaging device (or these images may be transferred from the aerial or robotic device later via a wired connection).

In some embodiments, the image acquisition system 101 may include a software application that runs on the electronic device to control operation of the imaging device. In some embodiments, the image acquisition system 101 includes a user interface (such as a microphone, keyboard or keypad) that can receive input from a user in typed or spoken form, and the software can be configured to receive commentary (voice or text) related to the images as the images are being captured. In one embodiment, the system enables the operator to perform all of the image acquisition actions from the ground and transmit the captured imagery to the insurance company.

In one embodiment, image acquisition system 101 can include or have access to a knowledge base 104 that stores image acquisition parameters that characterize how the imaging device should operate to capture digital images for a particular property damage incident, such as hurricane, hail storm, falling object, collision, etc. Examples of these parameters and methods include, but are not limited to, operation of the imaging device in response to various detected lighting conditions that a brightness sensor may detect (e.g., a command that operates a flash if the detected light level is below a threshold value, a size setting for an adjustable aperture of the optical path in the imaging device in which the size if a function of the detected light level, a speed setting that determines as a function of the detected light level a speed with which a shutter of the imaging device will open or close, or an ISO setting that determines a sensitivity of the imaging device as a function of the detected light level). Other image acquisition parameters include imaging device positions and orientations. In embodiments where the imaging device is part of an aerial drone, the image acquisition parameters may be a full flight path for the drone or parameters that govern, constrain, and/or guide its flight (such as waypoints in 3D space, orientation axes, speed settings, etc.). The parameters also may include commands to adjust for various other conditions that may be present when the digital images are captured, such as weather conditions or the like.

The knowledge base might also include tables from the insurance company that will be used to prepopulate data associated with the property owner's insurance policy or transmit data needed to match the images to a claim. It might also include a "how to" component that guides the user step by step and advises them on what images are needed and how to capture usable images.

Image analysis system 102 includes a processor and programming instructions to receive and automatically analyze the acquired images using a set of image processing criteria via computer vision, machine learning, and/or other methods and determine whether or not to process the property damage claim based on one or more claim processing criteria. The image analysis system 102 may determine whether legitimate, non-fraudulent property damage exists based on whether the damage is consistent with claims processing data 105 and optionally other corroborating data 106 (such as weather data, or other data confirming that an event that ostensibly caused the damage to actually occur). The image analysis system 102 may also determine the measurements and other data necessary to compute the cost of the repairs. Alternatively and/or additionally, the image analysis system 102 may also generate a request for some or all of this data from other systems or providers if the data is not determined or is unavailable. In some embodiments, the image analysis system 102 may also send some or all data necessary to compute the amount of the claim and to close it, to all downstream systems and parties involved in processing the claim. Various components of the image analysis system may operate automatically, or the system may operate substantially automatically with some human input or intervention.

Claim delivery system 103 communicates with other parties involved such as an insurance provider and includes a transceiver or communication port that can send data via a communication link, whether wired or wirelessly, and deliver the final disposition as to whether a claim is valid (or a command to send the claim for further review) based on a determination that property damage actually occurred. It may pass along, or trigger various downstream workflow alternatives, and deliver all data and measurements necessary to allow for the computation of the cost to repair the damage.

Figure 2A:
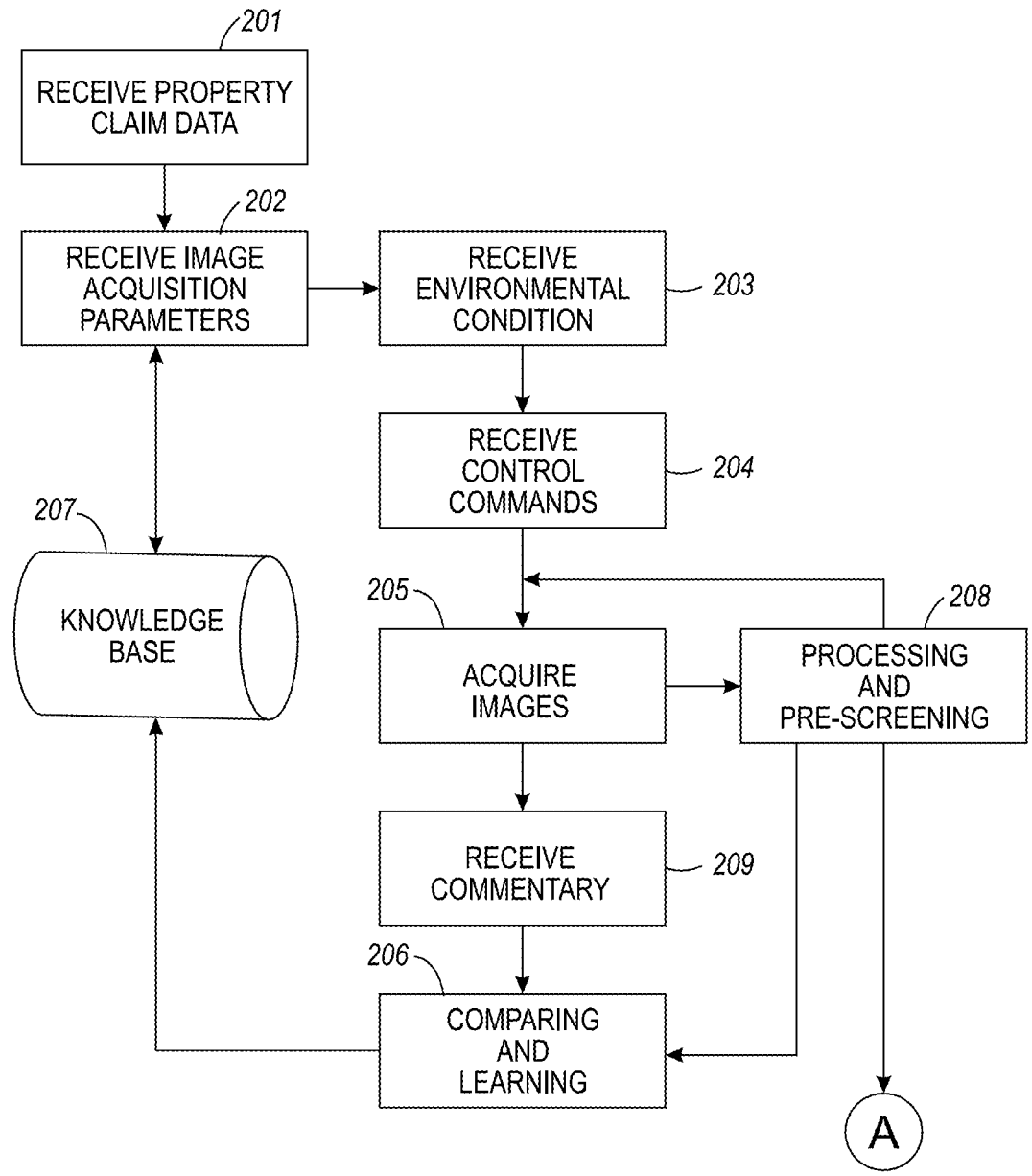
FIGS. 2A and 2B illustrate an embodiment of a property damage image capture, assessment and verification process.
Figure 2B:
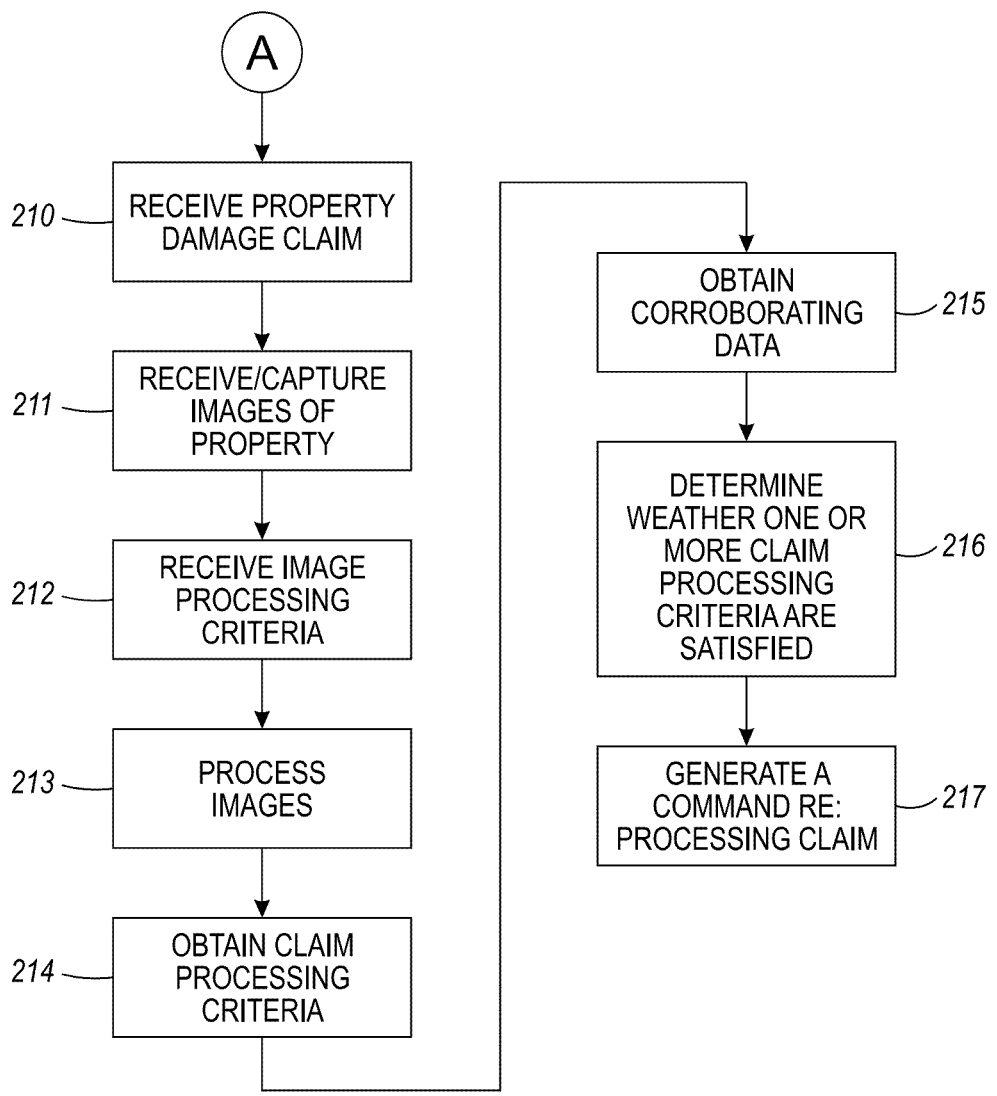

A property damage claim verification system is further explained, with reference to FIGS. 2A and 2B. With reference to FIG. 2A, the system may receive property damage claim data 201 that identifies the customer and identifying claim/policy data, the cause of damage and/or other detail about the property damage that the system will use to produce data needed for creating a repair estimate. For example, the damage claim data may include information indicating that the damage occurs on a roof caused by a hailstorm incident. The system may receive the cause of damage and other claim data from a user via a user interface, or from a digital message received from an external device.

The image acquisition system may then access a knowledge base 202 in which image acquisition parameters are stored, retrieved and associated with various property damage categories. The system can use the image acquisition parameters to capture digital images 205 of the property damage. For example, the system may receive a property damage claim related to a hail incident 201, and subsequently retrieve image acquisition parameters 202 from the knowledge base that are to be used for acquiring images related to a hail event category. Examples of image acquisition parameters may include configurable camera settings (focus, ISO, shutter speed, aperture size, flash on/off, resolution, focal length and field of view, depth of field, still or video mode, etc.), imaging device configurations (lens make and model, mounting configuration—tripod, monopod, handheld, drone, etc.), distance or distance range between the imaging device and the property that will be imaged, angle, flight path (for an aerial drone), and other parameters.

In some embodiments, the system may also receive one or more environmental conditions 203 and adjust the parameters used to capture the image based on the received condition. For example, the system may receive a light level from a brightness sensor and adjust one or more of the configurable camera settings to a value that is stored in the knowledge base as being associated with the light level. The system may receive data about weather and adjust the imaging device configuration based on the weather data, or it may receive data about obstacles in the environment of the property (e.g., trees, other buildings, etc.) and adjust the flight path of the aerial drone to avoid the obstacles. Other environmental conditions may be used to adjust operation of the imaging device before it captures the images 205.

In one embodiment, the image capturing device or another electronic device of the system can operate to acquire optimal imagery and associated voice and/or text commentary 209 via a user interface, in which case the system will store the captured images in association with the commentary (such as via metadata, or via connections in a database). If the system receives voice commentary it may convert the voice to text using any suitable speech recognition technology. The capturing of voice and/or text commentary about the images may be done synchronously or asynchronously. The system may allow or prompt the person operating the image capture device to supply the commentary, or it may allow another party to provide the commentary to describe what is contained in the images. The commentary may be at frame-level resolution, time-based or event-based (i.e., a sequence of frames), and can be used to assist the analysis of the imagery (303 in FIG. 3). Examples of commentary may include the specific part of the property captured in the frame, the direction that part of the property faces, commentary about the severity of the damage, etc. Methods to capture the commentary may include recording (text, voice or video) on a mobile device, a tablet or laptop, using a tape or digital voice recorder, or using paper with subsequent conversion into digital form such as scanning or optical character recognition (OCR), etc. In one embodiment, the method of acquiring commentary may include automatic linking of captured commentary information to a specific image frame or a sequence of image frames that are the subject of the commentary, via time- or frame number-based linking.

In another embodiment, the acquisition of optimal images may also include receiving control commands 204 via a user interface about what works well for imagery acquisition. Alternatively or in addition, the system may output guidance tips via a user interface and then receive control commands 204 in response to the guidance. In another example, if the platform for carrying the imaging device is an aerial drone, the system could take full control of the drone, its flight path, and the operation of the imaging device, based on parameters in the knowledge base, or it may refine operation based on the received commands.

The system may then process the captured images to identify images that depict damage of a type that corresponds to the category. Any suitable image processing algorithm now or hereafter known to those of skill in the art may be used in this analysis, such as an image classification or categorization algorithm. According to this approach, the captured image is assigned to a class or category based on its appearance and how it relates to the appearance of previously available images whose category is known. Specifically, features that concisely describe the image appearance including color values and histograms, texture, location and descriptors corresponding to points of interest, among others, are extracted from the image to obtain an image feature representation. Boundaries between different image categories or cluster parameters describing the categories in the feature space can be determined via the training of a classifier or a clustering algorithm operating on the feature representation of previously available images belonging to known categories. As a new image comes in, a like feature representation to that used in the training stage is extracted from the image, and a category or class membership can then be established based on the output of the trained classifier or clustering algorithm. The different categories can correspond to a category of damage, including damage produced by a hurricane, a hail storm, a falling object, or a collision. Alternatively and/or additionally, as the system acquires its digital images, the system can perform real-time (or very-near-real-time) processing of the images in order to adjust operation of the imaging device and/or the platform via which it is being used (hand-held, selfie stick, aerial drone, etc.) on the fly. For example, if the imaging device is on an aerial drone and the system detects a first image that represents property damage, the system may adjust the flight path of the drone to follow a path that is consistent with that of the detected damage. The system also may slow the speed of the drone's flight, increase image resolution, or take other actions upon detection of the actual damage.

In another embodiment, the processing 208 may include pre-screening a group of captured images to automatically detect images that satisfy one or more image quality criteria. Pre-screening can help the system assess a captured image's usability and determine whether it is likely to be good enough (perhaps even if not fully optimal) so that downstream image analysis steps can proceed reasonably successfully. Factors that characterize usability might include: focus, lighting, geometry (e.g., geometry of the roof, sensor, sun and the relative angles and physical distances between them), the quantity of imagery captured, etc. Pre-screening may employ various computer vision and image processing techniques appropriate for the particular usability factor being assessed. Alternatively and/or additionally, pre-screening may use the information in the knowledge base, such as parameters and/or methods in image acquisition. Images that are determined to have satisfied the image quality criteria may be kept, and others discarded. If the system fails to obtain a sufficient number of images that satisfy the image quality criteria, or if the available images do not yield sufficient data for the system's subsequent image processing steps, the system may automatically obtain (or prompt a system operator to obtain) additional images 205 that will then be pre-screened or otherwise processed 208 using procedures such as those described in this document.

The pre-screening may include performing some methods that use a portion of the image analysis system. For example, referring to FIG. 3 (which depicts methods of processing an image set and other data received with an image set), pre-screening may use image processing techniques that are used for image segmentation 301 to assess the captured images and determine if there are enough useable images available, or determine to pass on only useable image frames for a more detailed image analysis. In another example, pre-screening may use candidate damage detection 304 to determine which parts of the damaged property have and do not have useable images. In one embodiment, pre-screening may be performed in real- or near-real-time so that if the system determines that some or all of the imagery frames initially being captured are not usable, the operator capturing the imagery could try to capture better imagery right then and there.

In some embodiments, the system may develop the knowledge base by constructing and growing the knowledge base over time by controlled "laboratory" testing that could be done at both indoor and outdoor facilities at conditions that are more realistic and similar to actual conditions. Alternatively and/or additionally, the system may construct and grow the knowledge base over time by a feedback loop 206 that compares previously-received data to new data and learns new or updated parameters that improve the knowledge base 207 as the system is being used, the determination of updated image acquisition parameters can be done by pre-screening images as described above. In other embodiments, the system can determine updated image acquisition parameters as those that match or otherwise correspond to: (1) one or more camera settings used when the system captured an image that depicts property damage; (2) processed commentary received from a user via a user interface; or (3) characteristics of images that survive the pre-screening analysis described above. The updated image acquisition parameters could be used to further develop the knowledge base and/or to acquire future images to support a higher chance of success.

FIG. 2B illustrates how various components of the system may process one or more captured images and use the images to assess the validity of a property damage claim. In one embodiment, the system may receive property damage claim data 210, where the data contain one or more types of property damage incidents, such as wind damage, hail damage, falling objects, collision, etc. The system could receive, directly or indirectly from an image capturing device via a communication interface, one or more digital images of a property 211 that has been damaged by an incident such as wind, hail, lightning or the like. In one embodiment, the system may also capture the images of the property on its own by directly or remotely controlling the operation of an image capturing device.

The system will access a data storage facility to retrieve, or otherwise receive, image processing criteria 212 and process the images 213 according to a selected set of image processing criteria to identify one or more features in the images. In some embodiments, the image processing criteria may include criteria that are associated with the category. In some embodiments, the image processing criteria may include criteria that are associated with the imaging device, or that are defined by the insurance provider, or that are otherwise established. Example image processing criteria may include an image recognition algorithm such as an edge detection process or a pattern recognition algorithm, an image segmentation requirement (such as a requirement to divide images of a roof into shingle-specific or sector-specific sub-segments. For example, one roof segmentation approach may include an edge refining and filling algorithm that traces the boundaries of individual shingles based on their largely consistent orientations within a roof image. Another example includes running damage detection algorithms within each segmented shingle. Other image processing criteria may include a requirement to compare an image of a particular property segment with a previously-captured image of the property segment to determine whether the images have a difference in value that exceeds a threshold amount.

The system will also obtain one or more claim processing criteria 214 that are associated with a property damage incident category. For example, one of the claim processing criteria associated with hail may be that there must be roof damage. The system may then determine whether the result of the image processing performed on the images of the property indicates whether one or more claim processing criteria are satisfied 216. Claim processing criteria are those that enable the system to determine whether the image processing results include evidence of actual property damage that matches that of the received claim. Examples may include particular patterns, colors, shading or the like appearing on particular segments of the property. Based on the result of image analysis, the system may determine whether or not to process the claim or deny the claim, and generate a command accordingly 217. For example, if at least a threshold number or types of the claim processing criteria are satisfied, the system may generate a command to process the claim. The command may be an actual command to a claim processing system, or it may merely being a generated indicator that the claim should be approved or otherwise processed. If the claim processing criteria are not satisfied, or if the system is unable to make a conclusive determination for any reason, the system may generate a different command, such as one to deny the claim, to obtain more data that can be used in further analysis by the system, or to refer the claim to a human reviewer for additional analysis.

In one example, the system may analyze roof images and identify one or more bruises on the roof shingle. The system may further determine that the identified bruises satisfy a claim processing criterion associated with a hail incident. Subsequently, the system may proceed to process the damage claim.

As indicated in FIG. 1, image analysis system 102 may use claim data 105 and corroborating data 106. Claim data 105 that is necessary for image and claim processing (such as the image processing criteria and/or the claim processing criteria), and some of the data collected here may also be useful in subsequent steps in the system. Examples of claim data may include names and information of all parties involved in the claim, insurance policy and claim numbers, address or coordinates of the property, date and time of the purported damage event, date and time of when imagery was acquired, etc. In one embodiment, the system may also gather corroborating data 106 from one or more external sources that are related to the claim to help validate or refute the claim. These corroborating data may include weather records data such as the location, timing, track, severity and extent of a storm or other weather event; data about other claims for other properties in a geographic region within which the property is located (thus ostensibly related to the same damage event); images of the property from before the damage event; location coordinates of the property captured by a global positioning system (GPS) sensor of the system or other data. Returning to FIG. 2B, the system may receive the corroborating data 215 and also use the corroborating data to determine whether the claim processing criteria are satisfied 216. For example, in step 217 the system may only generate a command to process the property damage claim if the corroborating data indicates that the incident that caused the damage actually occurred; otherwise it may generate a command to have the claim reviewed by a person.

Returning again to FIG. 1, alternatively and/or additionally, the system may use a corpus of labeled imagery 107 for all of the analysis techniques that involve classification. For example, a labeled corpus may include: the methods and conditions by and under which the imagery was acquired, all other imagery-related metadata such as imagery labeling confidence estimates, etc. In one embodiment, the corpus of labeled imagery is continuously collected, assessed, and added to the system during the use of the system. For example, the claim delivery system 103 may deliver the imagery and associated final disposition confidence estimates to the system's corpus of labeled imagery. In some embodiments, the system may only generate a command to process the property damage claim if the confidence estimate exceeds a threshold; otherwise it may generate a command to have the claim reviewed by a person.

In one embodiment, as the corpus grows, the accuracy of the system will increase, especially as the system acquires and processes images showing various types of incidents, such as images showing legitimate hail damage, fraudulent damage, damage by other causes, and no damage at all. This can help improve the ability of the system so that it operates more automatically and requires less human input, especially in regards to analyzing newly captured images. In one embodiment, image metadata can be acquired at fine resolution, such as at every picture or video frame, or for a relatively small number of frames. The image metadata can be acquired so that there will be no need to have human-made markings on the property itself (such as made using chalk or tape) or in the image file (such as made by some electronic annotation program). In another embodiment, additional instances of the images that have markings at fine resolution are also desirable and could also be acquired.

With further illustration, examples of imagery-related metadata are shown below.

DATA FORMATS: Images may be in any and all formats available such as the camera's "raw" format and JPG with metadata such as exchangeable image file format (EXIF) data for each image. The EXIF data file contains information such as the focal length, aperture, shutter speed and ISO level of the imaging device.

DAMAGE LOCATION LABELING RESOLUTION: Damage location can be labeled at different resolutions, from pixel- to frame-level. For example, each picture or frame could be annotated at the pixel level, indicating whether that pixel represents a damaged area or not. This could be in addition to having the same image available without any annotation. Damage location could also be labeled at the tab or "tooth" level for roof shingles, at roof section level, at the whole roof/property level or at the whole image level.

DAMAGE SEVERITY: Damage severity could be provided in association with each damage location. For example, it may include how severe the damage was, e.g., was it just cosmetic, did it dent the surface, did it fracture the mat (the structural part of the shingle), etc. Alternatively and/or additionally, the industry may have a standard measurement scale, reference images, tools, and/or vocabulary to describe the damage (beyond what is depicted in literature used in the assessment industry such as the Haag Composition Roofs Damage Assessment Field Guide), and the damage severity could be provided using that scale and/or vocabulary DAMAGE CAUSE: For the images that include damage, or what might appear to be damage, the damage cause could be used to describe the root cause of the damage, such as hail, manufacturing defect, installation defect, people walking on the roof, fallen limb damage, fraudulent damage such as by a hammer, etc.

PROPERTY CHARACTERISTICS: Examples of property characteristics include: (A) location of the property, for example, the ZIP code or GPS coordinates of the property could be provided and used with date and time of day information to determine the sun azimuth and elevation and perhaps to correlate with publically available information about the storm; (B) compass orientation of the property (in which case the system will include a compass with digital output that passes measured orientation data to the processing device); (C) roof and shingle characteristics such as: pitch, orientation, and dimensions of each section of the roof; shingle manufacturer, model, quality, age, color, etc.; number of shingle layers on the roof; etc.

IMAGE CAPTURE CONDITIONS: These are measurable conditions or characteristics of the environment that existed when the image was captured. Examples include date, time of day, as well as weather conditions (e.g., sunny/partly, sunny/overcast, precipitation, wind speed and direction, temperature and humidity, etc.).

CAMERA CHARACTERISTICS: These are characteristics about the equipment used to capture the images and how the images were captured. Examples include attributes such as camera and lens make and model; whether the images were captured in still or video mode; resolution; frame rate (if applicable); shutter speed and/or aperture size; ISO level; focal length and field of view; depth of field; mounting conditions (e.g., on a tripod, monopod, handheld, aerial drone, robotic vehicle, etc.); distance from camera to the property or property section; angular orientation of the imaging device relative to the property or property section; or speed and direction that the imaging device platform was moving (if applicable).

OTHER DATA: Examples include: (A) weather reports and weather verification services reports; (B) claim data for other nearby properties; (C) images of the property before the damage event; or (D) any other data taken, or notes made by the adjuster, including those related to other damage sustained at the property during the same event (such as damage to roof protuberances, flashing, gutters, downspouts, house siding, windows, other property, etc.).

Figure 3:
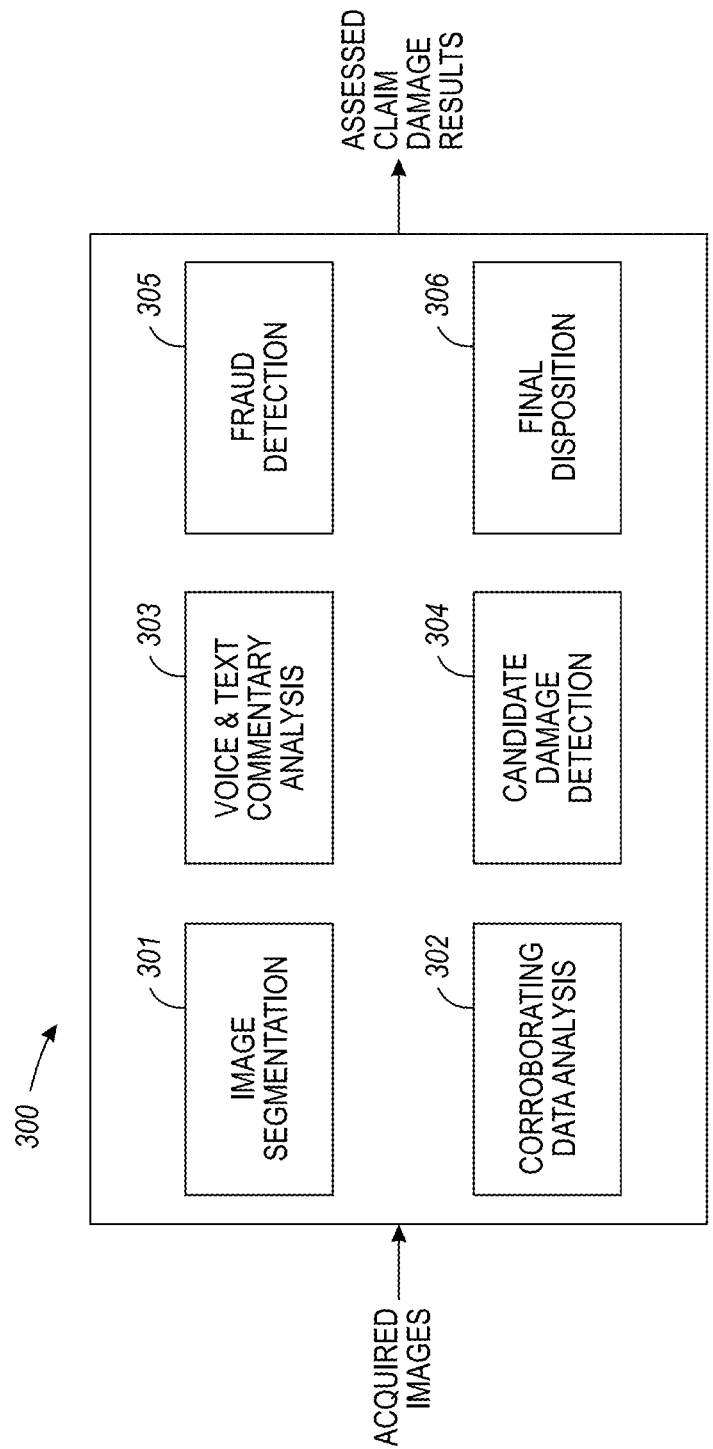
FIG. 3 illustrates various methods of image analysis.

With reference to FIG. 3, the image analysis system 300 may perform any or all of several processes, such as imagery segmentation 301, corroborating data analysis 302, voice and text commentary analysis 303, candidate damage detection 304, fraud detection 305 and determination of final claim disposition 306.

Image segmentation 301 is primarily the task of partitioning an image into segments. These segments can be used to assist a human reviewer with visualization or analysis, or each partitioned region can be passed on to other algorithms for further processing. An example of an image segmentation process is to segment a roof from the background of the property, or to segment a section of a roof. For example, asphalt is the most common type of residential roofing material used in the United States, and asphalt shingle composition roofs are predominantly of two types: traditional, "three tab" shingles (which are generally less expensive), and "architectural" or "laminated" shingles in which the side edges of each tab are cut at varying slightly-off-vertical angles so as to attempt to give the roof the look of a real wood shake roof (resulting in shapes that look somewhat like "teeth"). In some embodiments the system could process images of a residential roof to identify whether it has three tab shingles or laminated shingles.

In one embodiment, when analyzing an ostensibly damaged part of the property, such as a shingled roof, the segmentation may perform at the following levels: separating the roof from all other elements of the frame, segmenting each individual (and usually, but not always) planar section of the roof, and/or segmenting each shingle tab or "tooth." In other embodiments, the system may not need to perform segmentation, and instead, it may directly analyze the imagery on a full-frame basis.

While segmentation may not perform perfectly due to the variations of color and texture in the image, such as color and texture variation in each roof shingle, a non-perfect or partial segmentation may still provide critical cues to orientation of the camera with respect to the roof, and can also assist in overall roof localization. This is well within the scope of this disclosure since one of the main motivations for the roof segmentation is to assist further processing such as damage localization, which will be further discussed below.

Corroborating data analysis 302 may perform any necessary analysis on the corroborating data that has been collected, largely for the purpose of assisting in subsequent disposition of the claim, including fraud analysis. For example, in one embodiment, the corroborating data analysis 302 may use a compass to determine the orientation of the property and that of one or more segments of the property (e.g., the roof). In another embodiment, the system may capture data about the property such as GPS or other location data to determine where the property resides and is oriented relative to the damage incident and the damage incident's direction, severity, and extent, etc. The system may then obtain corroborating data from a third party service (such as a weather service) to determine whether the property data corresponds to the corroborating data. For instance, if it is determined that the property is miles away from the periphery of where a storm occurred (the latter being information that can be gathered from third party weather mapping services), it is more likely that a claim for property damage associated with the storm is fraudulent.

Voice and text commentary analysis 303 may process, extract, and link any voice or text commentary that is collected (whether that is done before, during, or after the imagery capture) with the images of the property. In one embodiment, the system may use the data contained in the commentary to help scope out the location, scale, and validity of the damage claim. For example, if there is audio commentary, especially if such commentary was gathered when a drone was in flight, the system may process the captured audio file to remove any background audio noise that is present. In another example, the system may also perform speech recognition, that is, voice-to-text translation, if needed, which can use known or later developed voice-to-text speech recognizer. In another example, the system may perform text analysis and link the commentary to the images' frames.

Candidate damage detection 304 can determine the presence or absence of legitimate property damage and assess whether there is sufficiently legitimate property damage to warrant the claim process to proceed. In one embodiment, the system may permit human intervention, for instance, by people reviewing the images captured of the property and identifying a candidate damage type (which represents that the damage is either consistent with the reported cause, or it is not consistent). Alternatively and/or additionally, the system may detect the damage type automatically through the use of various techniques in computer vision, machine learning, and/or other imagery analysis techniques. For example, the system may detect candidate damage types by comparing the images of the property captured before the damage event to that captured after the damage event. The system may also use a classifier-based approach or a heuristics-based approach, which will be described in detail below.

Figure 4A:
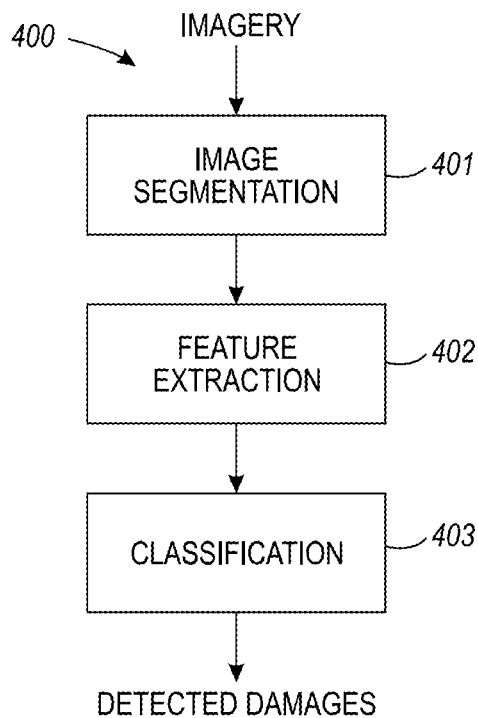
FIGS. 4A and 4B depict various embodiments of damage detection.

By way of example, and with reference to FIG. 4A, a classifier-based damage detection process 400 is further illustrated in the context of roof damage. It can be assumed that labeled data corresponding to images of damaged and undamaged roofs is available. The resolution of the labels dictates the resolution of the classification output. For example, damage can be labeled at the pixel-level, e.g., by identifying the location of pixels corresponding to damaged roof areas in the image. In another example, the damage labels can correspond to images, if the label identifies an image as containing a particular type of damage (which can include hail, wind, rot, etc.). A system that is trained based on these types of labels, will consequently produce classification labels of input imagery, effectively classifying the image as either containing a type of damage or not. Moreover, if either in addition to or in absence of a classification label, a severity score is known, a system that is based on a regression analysis can be trained to estimate the severity of damage for a given input image.

The above described classifier-based system 400 has two stages, a training stage and an inference stage. With reference to FIG. 4A, a classifier-based system 400 includes a feature extraction process 402 and a classifier that performs a classification process 403. The same feature extraction and classifier processes may be applied to both the training and inference stages. In one embodiment, in the training stage, the labels for each training image, that is, the class to which the image or pixels in the image belong to (e.g., damaged vs. undamaged) are, for example, assigned by a trained professional. The images, or more specifically their feature representations in some chosen feature space (extracted by the feature extraction 402), can be used to train a classifier. Various classifiers, such as a support vector machine (SVM), decision tree, clustering algorithm or neural network, can be used. The features can be hand-engineered and can include attributes such as size, shape, density, location, texture, color, and the like, or combinations thereof. For example, the features can correspond to the RGB values of the pixels, that is, the input image itself. The features can also be learned by a deep learning framework (e.g., a convolutional neural network) or a discriminative analysis process. In the training stage, the classifier learns to separate the feature descriptions of the damaged samples from those of the undamaged samples.

In the inference stage, the system takes an input image of a property or a portion of a property, such as a roof. In one embodiment, the system can proceed to extract the features 402 and compute a feature representation of the input image. The system can also use this feature representation in a classifier of a classification system 403 to determine a class for the input image. The classifier decision can be based on the inter-class boundary determined during the training stage.

Figure 5:
FIGS. 5 and 6 depict examples of damage detection on roof images according to one embodiment.
Figure 6:
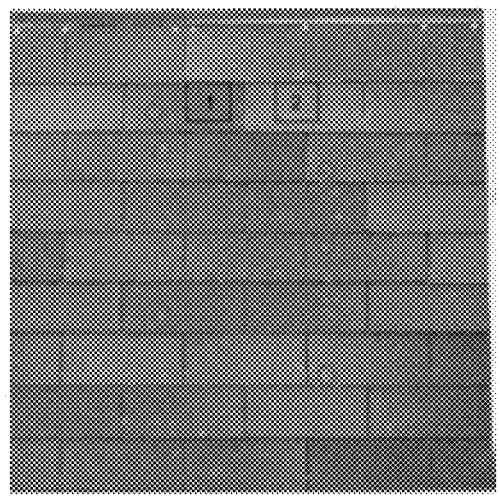

In some embodiments, the classifier-based system may further include image segmentation 401 to segment the received images into sub-regions, as the classification 403 may be simplified depending on the choice and appearance of the sub-region. For example, due to illumination, weathering, or other variations across the different areas of the roof, the difference in appearance between similarly damaged portions (or conversely, between different undamaged roof portions) may vary greatly. Making that determination on a per-region basis may result in higher accuracy damage detection results. In one embodiment, image segmentation 401 may segment an image into sub-regions that correspond to individual roof tiles. In alternative embodiments, the segmented sub-regions can contain groups of tiles or fractions thereof. Examples of roof images with detected damages (with damage marked by circles) are shown in FIG. 5 and FIG. 6.

Figure 4B:
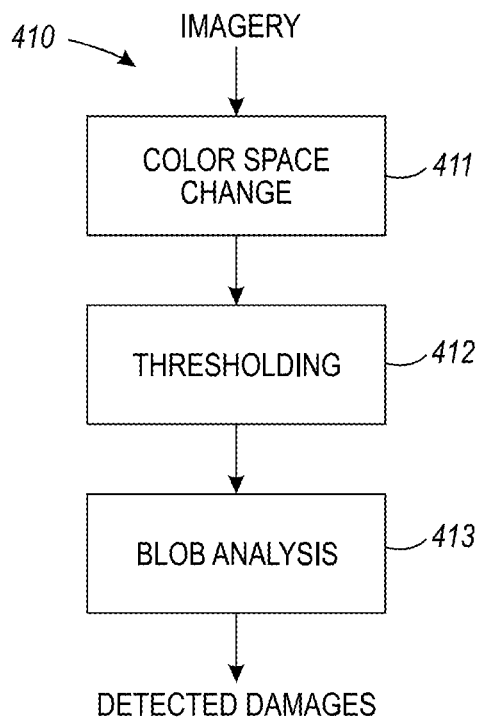

With reference to FIG. 4B, a heuristics-based damage detection process 410 is shown. This system uses the local disparity in image color and texture to detect damaged pixels in the imagery. For example, in a roof damage context, the system may first change the original RGB image to a color space 411 that provides a channel specific to brightness. In one example, the system can use any combination of the color channels in a color image, e.g., the green channel in a RGB image, or multiple channels in a hyperspectral image, to obtain a standard grayscale conversion. In another example, the system can use the value channel from the hue-saturation-value (HSV) color space to do the conversion. The process may further include thresholding 412, which separates each pixel into two classes based on the assumption that regions that contain hail damage often have different light reflectance values when compared with those pixels in the undamaged regions, and that the number of pixels that correspond to roof damage is far fewer than those that do not. For example, as shown in FIG. 5, the pixels that correspond to hail damaged regions contain higher reflectance values. For simplicity, the pixels that correspond to hail damaged regions are referred to as "foreground pixels" and those that correspond to undamaged roof portions as "background pixels." Groups or clusters of foreground pixels are also referred to as "blobs."

With further reference to FIG. 4B, blob analysis 413 further analyzes blobs of foreground pixels to find those that are consistent with hail strikes, in terms of size and shape. In one embodiment, blob analysis may use connected component analysis to find blobs that are under a threshold in terms of area (e.g., consists of fewer than N total pixels). Examples of roof images and detected damage are illustrated in FIGS. 5 and 6.

Returning to FIG. 3, a fraud detection process 305 can detect signs of fraudulent damage. For example, in assessing hail damage to a roof, the system may detect whether the homeowner had intentionally damaged the roof, such as with a ball-peen hammer. In this context, the system may detect: (A) whether the submitted imagery is actually of the property covered by the policy; or (B) whether the damage was caused fraudulently or by an actual weather event or by other legitimate damage-causing mechanisms such as manufacturing defects, installation defects, or by normal use of the property, etc. For the latter, for example, the detection 305 may be classifier-based or statistics- and pattern-based.

Final disposition 306 can determine whether or not to approve a claim. It is the culmination of all of the analysis and other steps that the system may perform before the final processing of the claim can happen. In one embodiment, the system may include determining if the claim is valid, i.e., whether there was legitimate damage to the insured property that warrants at least some payment to the policyholder. The system may also compute the confidence estimates with which the final disposition has been established. The system may also determine that additional data and measurements are necessary to allow for the computation of the repair amount. If some of the additional data and measurements needed are available from third-party partners or systems, the system may automatically generate requests for the data and transmit the requests to the third-party partner or system via a communications network. The final disposition may cause the system to generate a request that may be included in the communication of claim delivery system, as described previously. The system may also determine that a human expert must be called upon to make the final determination. In one embodiment, these determinations can be recorded to update the corpus of labeled imagery that can be assessed for future imagery analysis tasks.

As can be apparent to one ordinarily skilled in the art, some of the sub-systems in the image analysis system are optional and the sequence of methods implemented by these systems can vary. For instance, if a heuristics-based system is used to detect damage, then the system may segment the imagery minimally at the roof level but may not require that a corpus of labeled imagery be available. In another example, if a classification-based system is used, then the system may require labeled imagery but may not need to perform image segmentation. In other embodiments, corroborating data analysis 302, voice and/or text commentary analysis 303, or fraud detection 305 can be optional.

Returning to FIG. 1, the above embodiments can be configured in any variation as would be apparent to one ordinarily skilled in the art. For example, image acquisition may be used by one of a number of envisioned parties beyond the current insurance company or third-party adjusters. In another variation, when a property owner believes that his property has suffered damage that is covered by his insurance policy, he may go directly to another party, e.g., a roofing contractor or a drone flying service, who dispatches an operator, or he may operate the device himself. In another embodiment, any of the above actions in the system 100 could be performed by a user, as appropriate, to enhance the accuracy of the claim results.

In another variation, a contractor goes door-to-door in a neighborhood, one which was in or near the path of an incident (e.g., a storm) that potentially caused damage, and tells the property owners that they have sustained property damage and that they should contact their insurance company to file a claim. The contractor may also capture one or more images of property related to the incident using the image acquisition system 101 and transmit to the property owner one or more images that he claims is of the damage sustained by the property of the owner. The property owner may initiate a claim by contacting the insurance company and by sending in the imagery that was captured by the contractor. In another embodiment, the property owner may "self-serve" by acquiring images of the damaged part of his property using the image acquisition system 101. For example, the property owner may access or download the image acquisition system 101 in the form of software application on a mobile platform and use the property owner's own image capturing equipment, such as an imaging sensor on a camera, a mobile phone, a drone or other mobile devices.

Upon receiving the property owner's claim, the insurance provider may choose to use the images sent by the property owner for claim processing. Alternatively and/or additionally, the insurance provider may decide to collect images on its own, and use the image acquisition system 101 to acquire images using an image capturing device (possibly including drone). Other variations may also be possible as would be apparent to one ordinarily skilled in the art.

Figure 7:
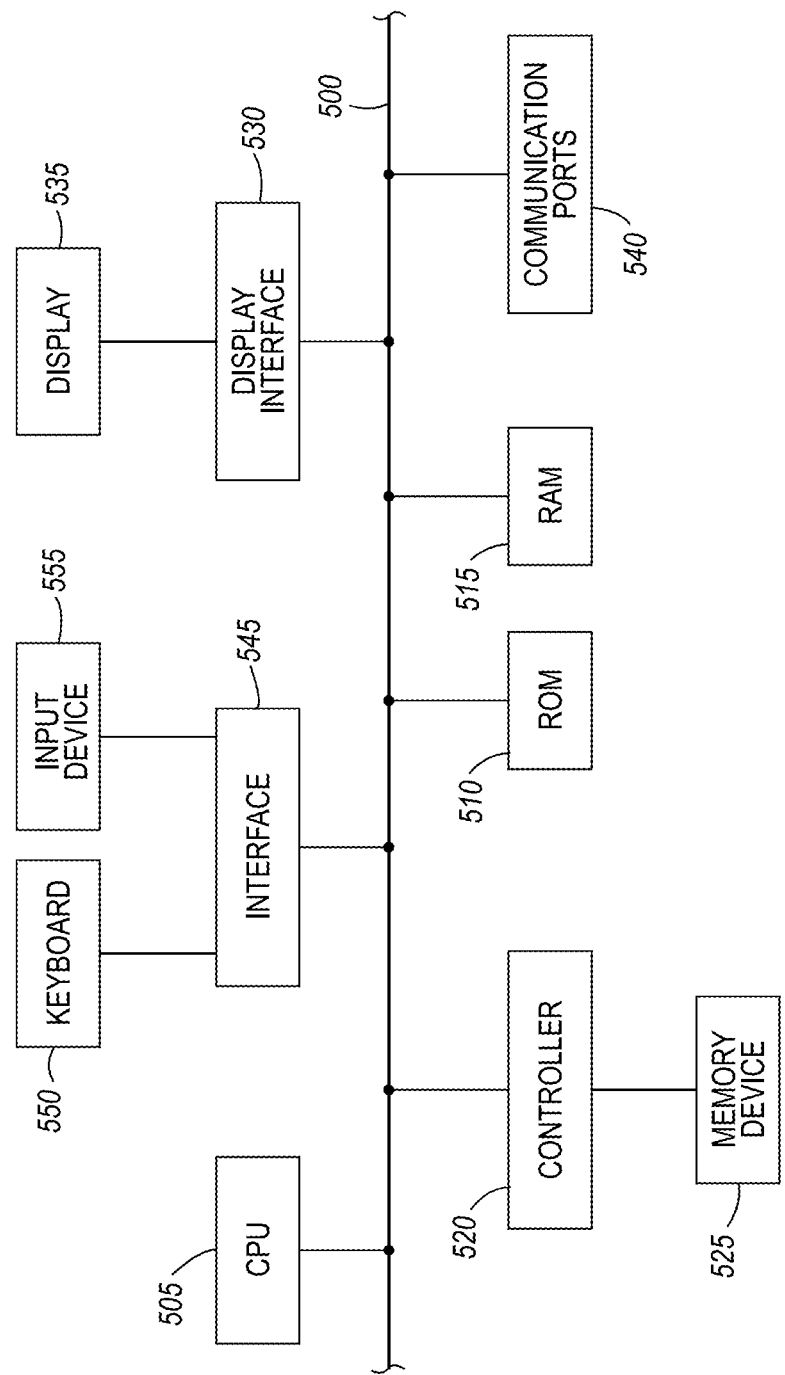
FIG. 7 depicts various embodiments of one or more electronic devices for implementing the various methods and processes described herein.

FIG. 7 depicts an example of internal hardware that may be included in any of the electronic components of the system, the user electronic device or another device in the system. An electrical bus 500 serves as an information highway interconnecting the other illustrated components of the hardware. Processor 505 is a central processing device of the system, configured to perform calculations and logic operations required to execute programming instructions. As used in this document and in the claims, the terms "processor" and "processing device" may refer to a single processor or any number of processors in a set of processors. Read only memory (ROM), random access memory (RAM), flash memory, hard drives and other devices capable of storing electronic data constitute examples of memory devices 510. A memory device may include a single device or a collection of devices across which data and/or instructions are stored.

An optional display interface 530 may permit information from the bus 500 to be displayed on a display device 545 in visual, graphic or alphanumeric format. An audio interface and audio output (such as a speaker) also may be provided. Communication with external devices may occur using various communication devices 540 such as a transmitter and/or receiver, antenna, an RFID tag and/or short-range or near-field communication circuitry. A communication device 540 may be attached to a communications network, such as the Internet, a local area network or a cellular telephone data network.

The hardware may also include a user interface sensor 545 that allows for receipt of data from input devices 550 such as a keyboard, a mouse, a joystick, a touchscreen, a remote control, a pointing device, a video input device (camera) and/or an audio input device (microphone). Data also may be received from an imaging capturing device 520 such of a scanner or camera. A location or other positional sensor 555 (e.g., GPS or gyroscope) and motion sensor 550 (e.g., accelerometer) may be included to detect position and movement of the device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A system for capturing property damage images, the system comprising:
    a data storage facility containing a knowledge base of property damage incident types and, for each incident type, one or more image acquisition parameters that are associated with the incident type;
    an imaging device mounted to an aerial drone;
    a processing device having one or more communications components configured to communicate with the data storage facility and the imaging device; and
    a computer-readable medium containing programming instructions that are configured to, when executed, cause the computer processor to:
        receive an incident type for a property damage claim of a property related to an incident,
        access the data storage facility and retrieve from the knowledge base one or more image acquisition parameters that are associated with the received property damage incident type,
        use the one or more image acquisition parameters to automatically cause the imaging device to capture digital images of the property using the retrieved one or more image acquisition parameters, wherein the one or more image acquisition parameters comprise a flight path for the aerial drone,
        automatically process a plurality of the digital images captured by the imaging device to identify at least one digital image that depicts property damage that corresponds to the incident type by:
            extracting from the knowledge base one or more image quality criteria that are associated with the received property damage incident type, and
            automatically detecting the at least one digital image having one or more characteristics that satisfy the one or more image quality criteria, and
        upon identification of the at least one digital image that depicts property damage that corresponds to the incident type, adjust the flight path for the aerial drone based on one or more of the identified at least one digital image.

2. The system of claim 1:
    further comprising a brightness sensor, and programming instructions that are configured to cause the processing device to receive a light level that is detected by the brightness sensor, and
    wherein the retrieved one or more image acquisition parameters include or more of the following:
        a command that determines whether to operate a flash that is associated with the imaging device,
        a setting that determines a size for an adjustable aperture of the optical path in the imaging device,
        a speed setting that determines a speed with which a shutter of the imaging device will open or close, or an ISO setting that determines a sensitivity of the imaging device.

3. The system of claim 1, wherein:
the knowledge base further comprises image acquisition guidance data;
the system further comprises a user interface that is in communication with the processing device; and
the system further comprises additional programming instructions that are configured to cause the processing device to:
retrieve from the knowledge base image acquisition guidance applicable to capturing one or more images associated with the incident type; and
display the image acquisition guidance on the user interface.

4. The system of claim 1, wherein:
the system further comprises a user interface that is in communication with the processing device;
the system further comprises additional programming instructions that are configured to cause the processing device to:
receive, via the user interface, a camera setting,
cause the imaging device to capture a plurality of additional digital images of the property using the camera setting,
automatically process the plurality of additional digital images to identify at least one digital image that depicts property damage that corresponds to the incident type,
identify an updated image acquisition parameter corresponding to one or more camera settings used when the imaging device captured at least one digital image that depicts property damage that corresponds to the incident type, and
save the updated image acquisition parameter to the knowledge base.

5. The system of claim 1, wherein:
the system further comprises a user interface that is in communication with the processing device;
the system further comprises additional programming instructions that are configured to cause the processing device to:
prompt a user to enter, via the user interface, voice or text commentary while the imaging device is capturing a plurality of digital images of the property, and
save the plurality of digital images to a digital file with annotations corresponding to the commentary.

6. The system of claim 1, wherein:
the system further comprises a user interface that is in communication with the processing device;
the system further comprises additional programming instructions that are configured to cause the processing device to:
prompt a user to enter, via the user interface, voice or text commentary while the imaging device is capturing a plurality of digital images of the property, and
process the commentary and the captured digital images to identify an updated image acquisition parameter,
save the updated image acquisition parameter to the knowledge base.

7. The system of claim 1, wherein:
the knowledge base comprises, for each property damage incident type, one or more associated image quality criteria; and the instructions further comprise instructions to pre-screen the captured digital images to identify one or more images that qualify for use in a property damage claim assessment by:
accessing the knowledge base and extracting one or more image quality criteria that are associated with the received property damage incident type,
processing the captured digital images to identify one or more digital images having characteristics that satisfy the one or more image quality criteria, and
selecting the identified one or more digital images as the one or more images that qualify for use in the property damage claim assessment.

8. The system of claim 7, further comprising additional programming instructions that are configured to cause the processing device to:
save the one or more images that qualify for use in the property damage claim assessment to the knowledge base; and
discard any of the captured images that do not qualify for use in the property damage claim assessment.

9. The system of claim 7, further comprising additional programming instructions that are configured to cause the processing device to:
use the characteristics to identify an updated image acquisition parameter; and
save the updated image acquisition parameter to the knowledge base.

10. A method of capturing property damage images, the system comprising:
by a processing device, executing programming instructions that cause the processing device to:
receive a property damage incident type for a property damage claim of a property related to an incident,
access a data storage facility containing a knowledge base of property damage incident types and, for each incident type, one or more image acquisition parameters that are associated with the incident type,
retrieve, from the knowledge base, one or more image acquisition parameters that are associated with the received property damage incident type, wherein the one or more image acquisition parameters comprise a flight path for an aerial drone,
cause an imaging device mounted to the aerial drone to use the one or more image acquisition parameters to automatically capture digital images of the property,
automatically process a plurality of the digital images captured by the imaging device to identify at least one digital image that depicts property damage that corresponds to the incident type by:
extracting, from the data storage facility, one or more image quality criteria that are associated with the received property damage incident type;
automatically detecting the at least one digital image having one or more characteristics that satisfy the one or more image quality criteria, and
upon identification of the at least one digital image that depicts property damage that corresponds to the incident type, adjust a flight path of the aerial drone based on one or more of the identified at least digital image.

11. The method of claim 10:
further comprising receiving a light level from a brightness sensor; and
wherein the retrieved one or more image acquisition parameters comprise one or more of the following:

a command that determines whether to operate a flash that is associated with the imaging device, a setting that determines a size for an adjustable aperture of the optical path in the imaging device, a speed setting that determines a speed with which a shutter of the imaging device will open or close, or an ISO setting that determines a sensitivity of the imaging device.

12. The method of claim 10, wherein:

the knowledge base further comprises image acquisition guidance data; and the method further comprises, by the processing device:
retrieving, from the knowledge base, image acquisition guidance applicable to capturing one or more images associated with the category; and
displaying the image acquisition guidance on a user interface.

13. The method of claim 10, further comprising, by the processing device:

receiving a revised camera setting;

causing the imaging device to capture a plurality of additional digital images of the property using the revised camera setting;

automatically processing the plurality of additional digital images to identify at least one digital image that depicts property damage that corresponds to the incident type;

identifying an updated image acquisition parameter corresponding to one or more camera settings used when the imaging device captured the at least one digital image that depicts the property damage that corresponds to the incident type; and saving the updated image acquisition parameter to the knowledge base.

14. The method of claim 10, further comprising, by the processing device:

prompting a user to enter, via a user interface, voice or text commentary while the imaging device is capturing a plurality of digital images of the property; and saving the plurality of digital images to a digital file with annotations corresponding to the commentary.

15. The method of claim 10, further comprising, by the processing device:

prompting a user to enter, via the user interface, voice or text commentary while the imaging device is capturing a plurality of digital images of the property;

processing the commentary and the captured digital images to identify an updated image acquisition parameter; and saving the updated image acquisition parameter to the knowledge base.

16. The method of claim 10, wherein:

the knowledge base comprises, for each property damage incident type, one or more associated image quality criteria; and the method further comprises, by the processing device:
pre-screening the captured digital images to identify one or more images that qualify for use in a property damage claim assessment by:
accessing the knowledge base and extracting one or more image quality criteria that are associated with the received property damage incident type,
processing the captured digital images to identify one or more digital images having characteristics that satisfy the one or more image quality criteria, and
selecting the identified one or more digital images as the one or more images that qualify for use in the property damage claim assessment.

17. The method of claim 16, further comprising, by the processing device:

saving the one or more images that qualify for use in the property damage claim assessment to the knowledge base; and discarding any of the captured images that do not qualify for use in the property damage claim assessment.

18. The method of claim 16, further comprising, by the processing device:

using the characteristics to identify an updated image acquisition parameter; and saving the updated image acquisition parameter to the knowledge base.

* * * * *